United States Patent [19]

Kajitani et al.

[11] Patent Number: 5,240,097
[45] Date of Patent: Aug. 31, 1993

[54] PULL-TYPE CLUTCH

[75] Inventors: Koji Kajitani; Masaaki Asada; Yoshinari Yoshimura, all of Neyagawa, Japan

[73] Assignee: Kabushiki Kaisha Daikin Seisakosho, Osaka, Japan

[21] Appl. No.: 778,857

[22] PCT Filed: May 9, 1991

[86] PCT No.: PCT/JP91/00616
§ 371 Date: Jan. 7, 1992
§ 102(e) Date: Jan. 7, 1992

[87] PCT Pub. No.: WO91/17370
PCT Pub. Date: Nov. 14, 1991

[30] Foreign Application Priority Data

May 10, 1990 [JP] Japan ............... 2-49289[U]

[51] Int. Cl.⁵ .................. F16D 23/14; F16D 13/71
[52] U.S. Cl. .................... 192/89 B; 192/98
[58] Field of Search ............ 192/89 B, 98, 110 B, 192/70.13

[56] References Cited

U.S. PATENT DOCUMENTS

| 4,109,773 | 8/1978 | Higgerson et al. | 192/98 X |
| 4,643,286 | 2/1987 | Lassiaz | 192/98 |
| 4,646,901 | 3/1987 | Lassiaz et al. | 192/89 B X |
| 4,660,701 | 4/1987 | Lassiaz et al. | 192/110 B X |
| 4,718,528 | 1/1988 | Caron et al. | 192/98 |
| 4,832,166 | 5/1989 | Parzefall | 192/70.13 X |

FOREIGN PATENT DOCUMENTS 2539832 7/1984 France ............... 192/98
61-175324 8/1986 Japan .

Primary Examiner—Rodney H. Bonck
Attorney, Agent, or Firm—Armstrong, Westerman, Hattori, McLeland & Naughton

[57] ABSTRACT

A pull-type clutch having an inner peripheral part of a diaphragm spring sandwiched between a lever plate and a retainer plate both being installed at an outer periphery of a release bearing. The lever plate has a cylindrical body and a radial outer flange at an axial forward side of the cylindrical body and the retainer plate has a disc-like annular body and a plurality of claws extending in radial inward direction and a plurality of projections extending in radial inward and axial forward directions, at an inner periphery of the disc-like annular body with spaces left therebetween. A groove is formed on an outer periphery of the cylindrical body of the lever plate and the tip ends of the claws fit in the grooves so as to secure the retainer plate to the outer periphery of the cylindrical body. The inner peripheral part of the diaphragm spring is sandwiched between the flange and the disc-like annular body radially outside of the projections.

2 Claims, 4 Drawing Sheets

PULL-TYPE CLUTCH

TECHNICAL FIELD

This invention relates to a pull-type clutch, and particularly to a mechanism for connecting an inner peripheral part of a diaphragm spring and a release bearing.

BACKGROUND ART

As is generally known, a diaphragm spring is a component for urging a pressure plate toward a friction facing of a clutch disc. A pull-type clutch is so designed that an inner peripheral part of the diaphragm spring is connected to a release bearing and is moved backward in an axial direction of the clutch when the release bearing is moved in an axial direction away from a flywheel (backward in the axial direction). The clutch is thus disengaged.

An example of a conventional pull-type clutch is shown in FIG. 5. In such clutch, a clutch disc 12 is fixed to a clutch output shaft 11 and, a friction facing 13 provided at an outer periphery of the clutch disc 12 is urged toward a flywheel 15 by a pressure plate 14, to engage the clutch. An annular diaphragm spring 9 is positioned at an axial backside of the pressure plate 14, and urges the pressure plate 14 toward the facing 13. A radial peripheral portion of the diaphragm spring 9 contacts the pressure plate 14 and is supported by a fulcrum point 17 of a clutch cover 16 secured to the flywheel 15. The diaphragm spring 9 has radial slits 10 extending from radial intermediate portions to inner peripheral parts 9a, and the inner peripheral parts 9a are connected to a release bearing 1. The release bearing 1 fits onto an outer periphery of the clutch output shaft 11 through a sleeve 20. A lever 18 connected to a clutch pedal (not shown), moves release bearing 1 backward in the axial direction when the clutch pedal is depressed.

A mechanism connecting release bearing 1 and the inner peripheral part 9a of the diaphragm spring 9, in the conventional pull-type clutch, is shown in FIG. 6 in an enlarged manner. A wedge collar 2 fits onto an outer periphery of the release bearing 1 (inner race portion). The wedge collar 2 has a radial outward flange 2a at its radial axial backside end. A substantially V-shaped bent portion 2b formed at an axial forward tip end, fits onto a substantially V-shaped groove 1a formed at an axial forward tip end of the release bearing 1. An outer peripheral surface of the bent portion 2b has an annular groove 2c. A snap ring 3 is attached to the groove 2c. An axial forward tip end 2d of the wedge collar 2 extends forward in the axial direction and opens into a tapered shape relative to the snap ring 3. The snap ring 3 is thereby prevented from slipping off, in the axial forward direction, from the wedge collar 2.

Lever plate 4 is installed on an outer periphery of the wedge collar 2 with the snap ring 3 therebetween. The lever plate 4 integrally has a radial outward flange 5 at an axial forward end of a cylindrical body. FIG. 7 is a view showing the entire lever plate 4 viewing in a direction VII of FIG. 6, and, FIG. 8 is a sectional view taken on a line VIII—VIII of FIG. 7. The flange 5 includes, at its intermediate portion an extension 50 which has an arcuate section extending backward in the axial direction of flange 5. In lever plate 4, FIG. 6 an annular stepped part 4a which engages with the snap ring 3 from the axial backside, is formed on a surface facing on an outer periphery of the wedge collar 2, and a tapered guide surface 4b is formed on an inner peripheral end adjacent to the tip end 2d of wedge collar 2. Because the wedge collar 2 is fit onto the outer periphery of the release bearing 1 and the lever plate 4 is fit onto the outer periphery of the wedge collar 2, so as to engage with the snap ring 3 at the stepped part 4a, as described above, the wedge collar 2 is moved together with and in the same direction as the lever plate 4 when the release bearing 1 is moved backward in the axial direction.

The flange 5 is coupled, by a retainer plate 6, to the diaphragm spring 9 immovably in axial forward and backward directions. The retainer plate 6 integrally contains axially forward bent projections 8, at plural places, on a radial outer periphery of a disc-like annular body 7. FIG. 9 is a view of the entire retainer plate 6, viewing in a direction IX of FIG. 6, and FIG. 10 is a sectional view taken on a line X—X of FIG. 9. The bent projections 8 extend through the plural slits 10 of the diaphragm spring 9 and through grooves 5c, provided at a radial outer periphery of the flange 5, and tip ends 8a bent inwardly, in radial directions, engage with a radial outside portion of an axial front side surface 5a of the flange 5. The body 7 includes, at its intermediate portion, an extension 70 having an arcuate section and extending forward in the axial direction.

The inner peripheral part 9a of the diaphragm spring 9 is sandwiched between the body 7 of the retainer plate 6 and the flange 5 of the lever plate 4, as illustrated by FIG. 6 and FIG. 11. In FIG. 11, bent projections 80 (FIG. 9 & FIG. 10) which are formed alternately with the bent projections 8 in a circumferential direction of the retainer plate 6, pass only through the slits 10 of the diaphragm spring 9 but are not engaged with the lever plate 4.

In the pull-type clutch as constructed above, however, the bent projections 8 of the retainer plate 6 are made engage with the lever plate 4 through the slits 10 of the diaphragm spring 9, so that it is hard for the lever plate 4 to move relative to the diaphragm spring 9. For this reason, when a deviation between centers of the lever plate 4 and the flywheel 15 at time of manufacture was produced, a misalignment arises because of difficulty in remedy of the deviation. Such a misalignment will cause an assembly state of deviated centers between the clutch and transmission, so that vibration of the clutch pedal and breakage of the sleeve 20 (FIG. 5) will result. If widths of the slits 10 of the diaphragm spring 9 are widened, to allow the lever plate 4 to move relative to the diaphragm spring 9, the bent projections 8 of the retainer plate 6 will be worn out quickly. In order to solve this problem, a countermeasure may be taken in which a part of the bent projection 8 is subjected to carbon-proof and sintering processes. However, this measure is troublesome and requires a high cost.

It is an object of this invention to provide a pull-type clutch which allows the relative movement between the lever plate and the diaphragm spring so as to absorb the misalignment easily, and for preventing the clutch pedal from vibrating and the sleeve from being damaged.

DISCLOSURE OF THE INVENTION

The present invention provides a pull-type clutch, in which a release bearing fits through a sleeve onto an outer periphery of a clutch output shaft, an inner peripheral part of a diaphragm spring is sandwiched between a lever plate and a retainer plate installed at an outer periphery of the release bearing, respectively, and the release bearing is moved backward in an axial direction, away from the flywheel, to move the inner peripheral part of the diaphragm spring in the same direction so as to disengage the clutch; characterized by that the lever plate has a radial outward flange at an axial front side of its cylindrical body, the retainer plate has plural claws extending in radial inward directions and plural projections extending radially inward and, further, in axial forward directions, at its inner periphery of a disc-like annular body with proper spaces left between them, a groove is formed on an outer periphery of the cylindrical body of the lever plate, tip ends of the claws are fitted in the groove so as to secure the retainer plate to the outer periphery of the cylindrical body, and the inner peripheral part of the diaphragm spring is sandwiched between the flange of the lever plate and the disc-like annular body of the retainer plate radially outside of the projections of the retainer plate.

In the above-mentioned construction, no part of the retainer passes through the slits of the diaphragm spring so that it is easy for the diaphragm spring to move relative to the lever plate. Further, because movement of the inner peripheral part of diaphragm spring to the inside is restricted by the projections of the retainer plate, the claws and the cylindrical body are prevented from being damaged by the inner peripheral part of the diaphragm spring.

BEST MODE FOR CARRYING OUT THE INVENTION

Figure 1:
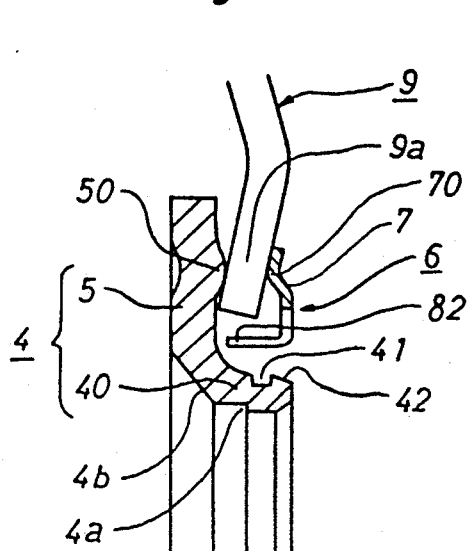
FIG. 1 is a vertical sectional view showing a connecting portion between an inner peripheral part of diaphragm spring and a release bearing of a pull-type clutch according to the present invention.
Figure 2:
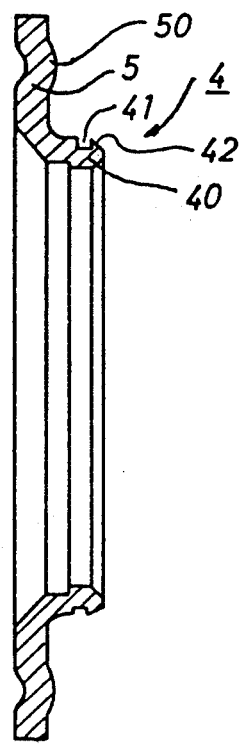
FIG. 2 is a vertical sectional view showing a lever plate for use in the embodiment of FIG. 1.
Figure 3:
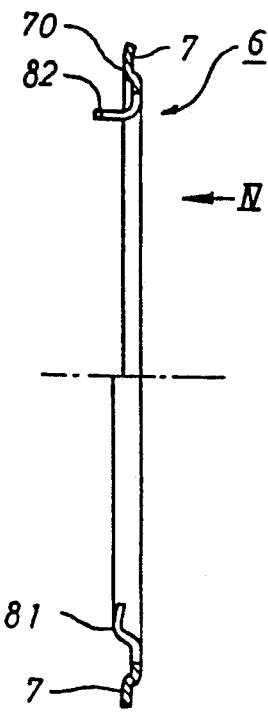
FIG. 3 is a vertical sectional view showing a retainer plate for use in the embodiment of FIG. 1.
Figure 4:
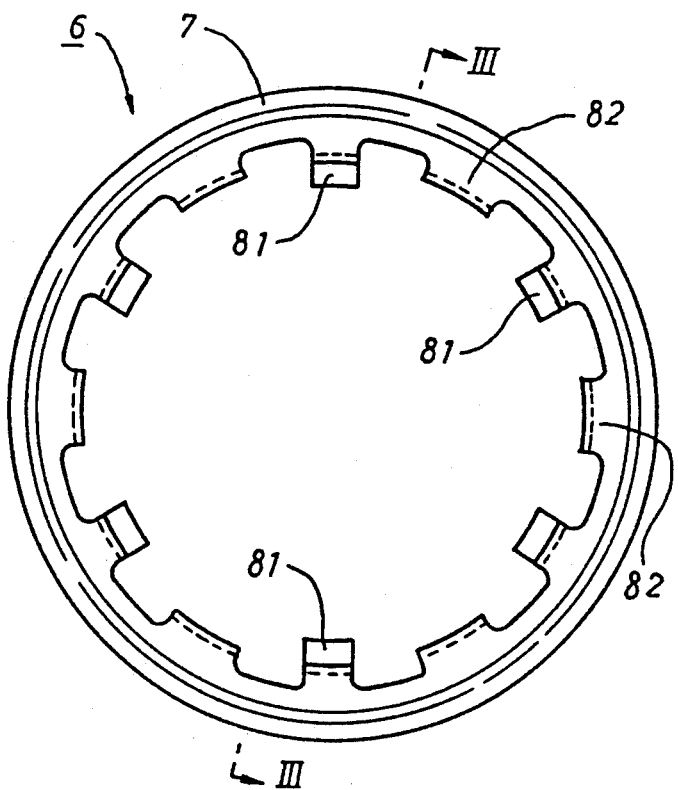
FIG. 4 is a view in a direction of arrow IV of FIG. 3.
Figure 5:
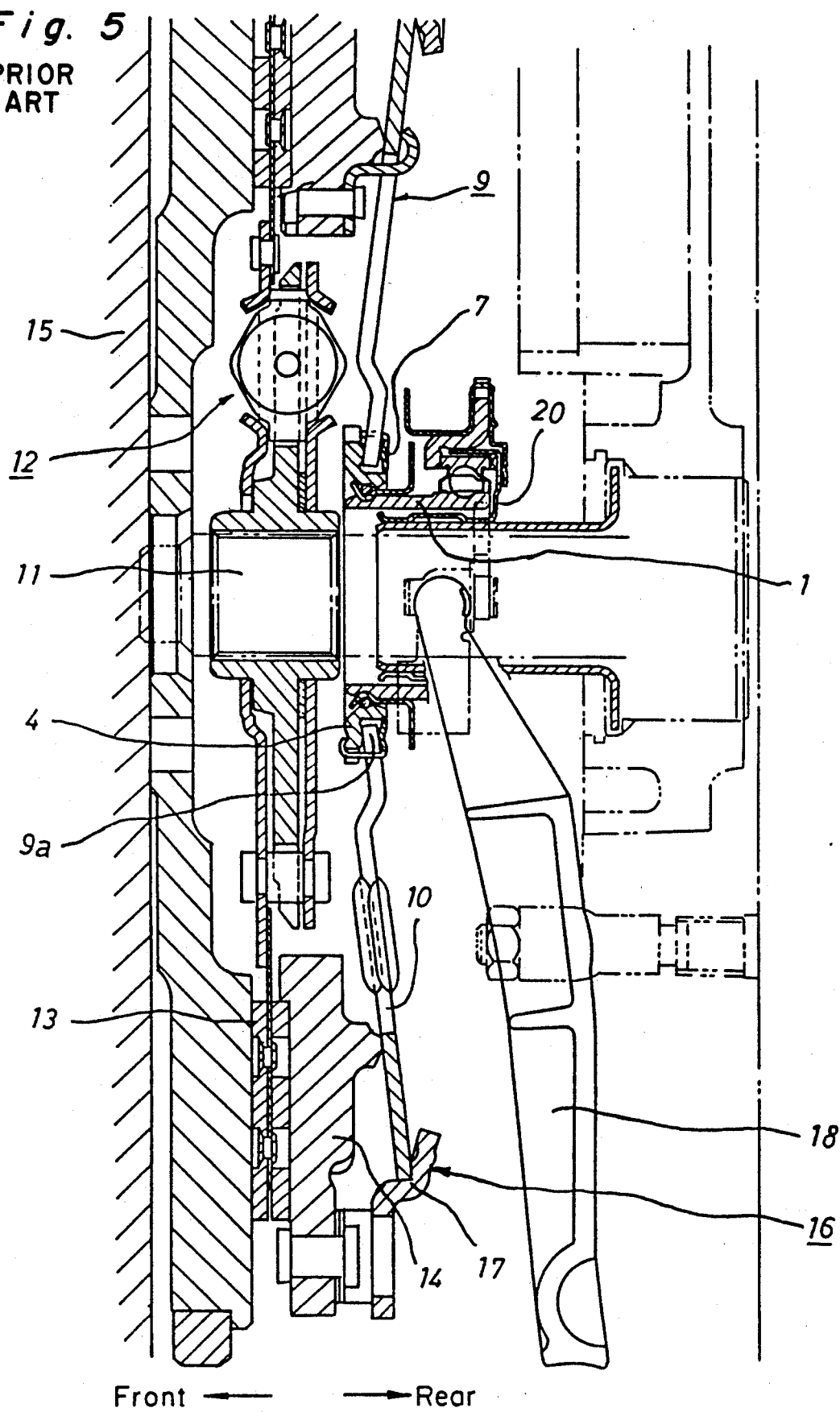
FIG. 5 is a vertical sectional partial view showing a conventional pull-type clutch.
Figure 6:
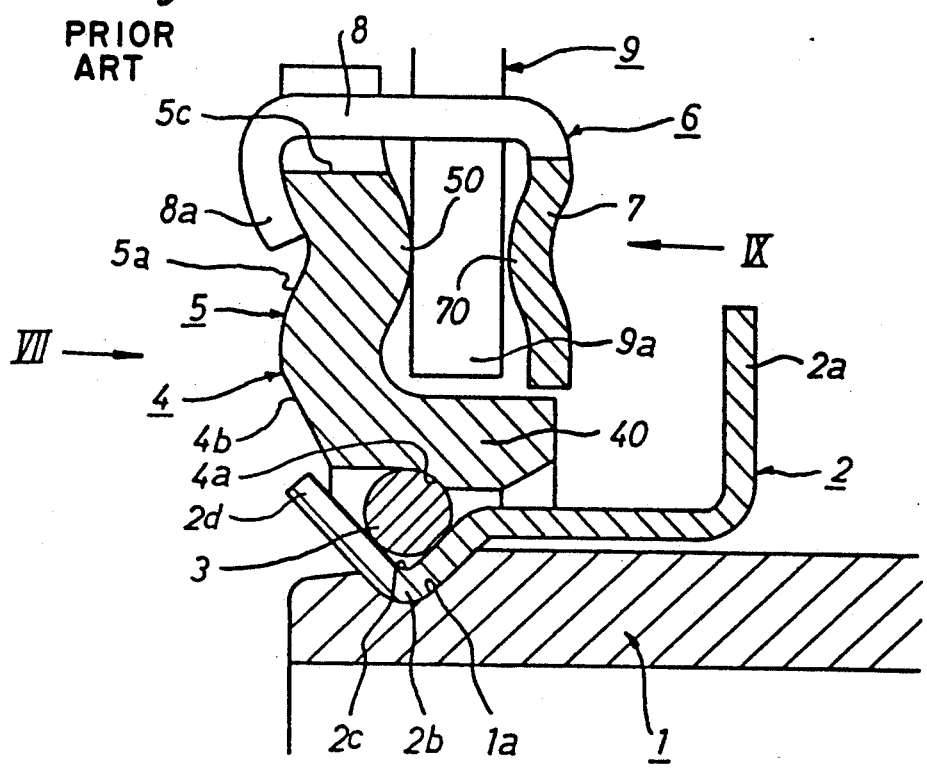
FIG. 6 is an enlarged vertical sectional view showing a connecting portion between the inner peripheral part of diaphragm spring and the release bearing in the embodiment of FIG. 5.
Figure 7:
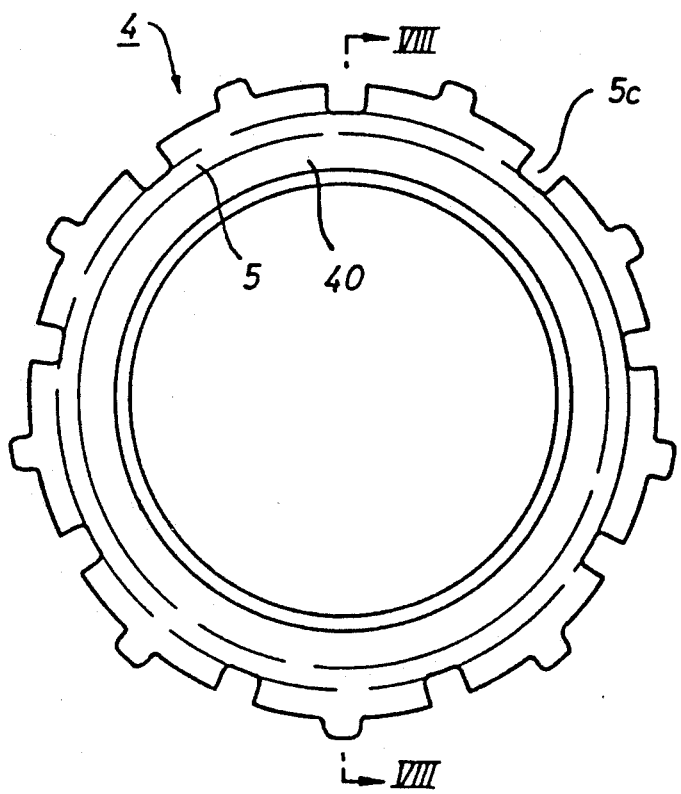
FIG. 7 is a general view showing the lever plate viewed in a direction of arrow VII of FIG. 6.
Figure 8:
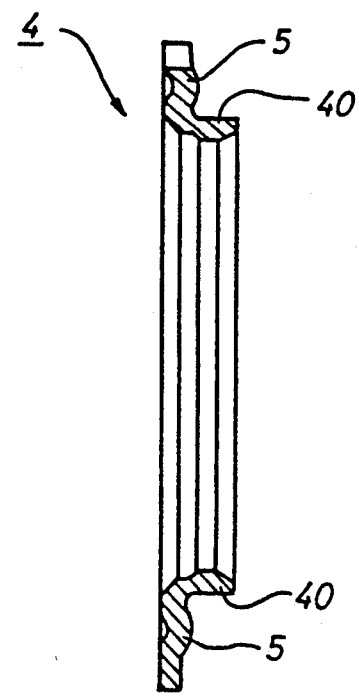
FIG. 8 is a sectional view taken on a line VIII—VIII of FIG. 7.
Figure 11:
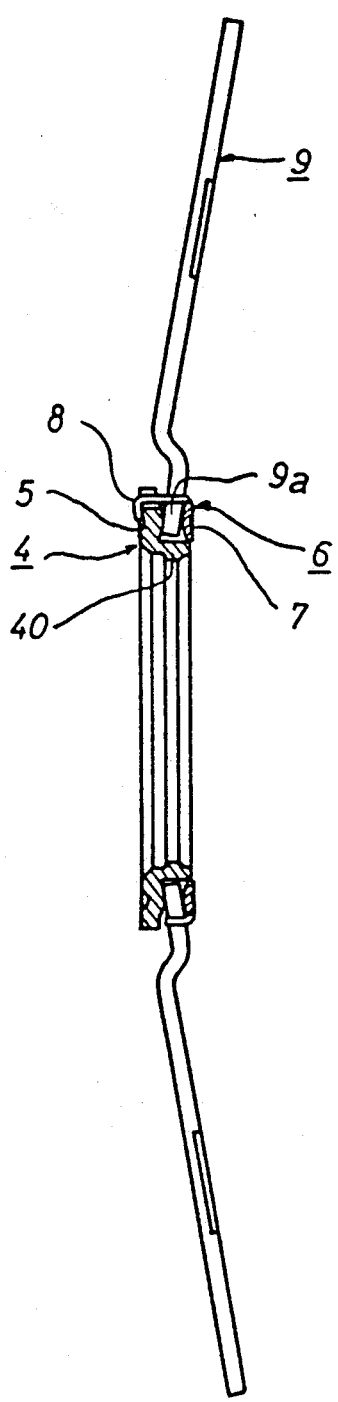
FIG. 11 is a vertical sectional view briefly showing the connecting portion between the inner peripheral part of diaphragm spring and the release bearing of the embodiment of FIG. 5.

The embodiment of this invention will be described hereunder with reference to the drawings. FIG. 1 is the vertical sectional view showing the connecting portion between the inner peripheral part of diaphragm spring and the release bearing of the pull-type clutch according to the present invention. FIG. 2 is the vertical sectional view showing the lever plate. FIG. 3 is the vertical sectional view showing the retainer plate taken along line III—III of FIG. 4. FIG. 4 is the view in the direction of arrow IV of FIG. 3. In these figures, components having the same symbols as those of FIG. 5 and FIG. 6 represent the same or corresponding components. On an outer periphery of the cylindrical body 40 of the lever plate 4, a groove 41 is formed to extend around its entire circumference. An outer peripheral surface 42 of the body 40 provided at axial backside of the groove 41 is formed into a tapered surface which inclines inwardly and rearwardly in the axial direction. The extension 50, the annular stepped part 4a and the tapered guide surface 4b are similar to those for the lever plate 4 shown by FIG. 6. The conventional groove 5c (FIG. 6) is not formed on the outer periphery of the flange 5 FIG. 1.

Figure 9:
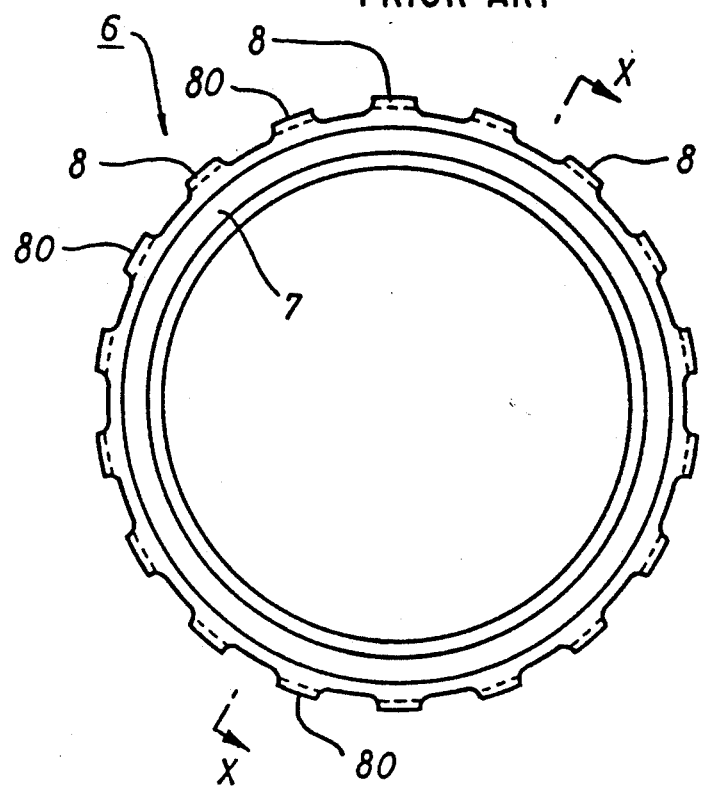
FIG. 9 is a general view showing the retainer plate viewed in a direction of arrow IX of FIG. 6.
Figure 10:
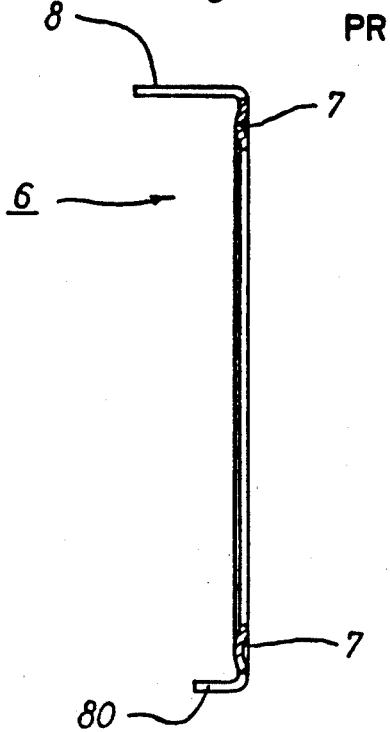
FIG. 10 is a sectional view taken on a line X—X of FIG.9.

The retainer plate 6 is made of spring material, for example, and integrally includes six claws 81 and six projections 82 on an inner periphery of the disc-like annular body 7. The claws 81 and the projections 82 are disposed alternately with equal spaces therebetween. The claws 81 extend inwardly, in radial directions, in such a way as to protrude forwardly in the axial direction, and the projections 82 extend inwardly in radial directions and further forwardly in the axial direction. The body 7 has the extension 70. The conventional bent projections 8 and 80 (FIG. 9, FIG. 10) are not present and are not formed on the body 7.

Tip ends of the claws 81 slide on the tapered surface 42 from the backside to the front side in the axial direction so as to be fit in the groove 41, so that the retainer plate 6 can be secured to the outer periphery of the cylindrical body 40. The inner peripheral part 9a of the diaphragm spring 9 is sandwiched between the flange 5 of the lever plate 4 and the body 7 of the retainer plate 6 radially outside of the projections 82. Axial lengths of the projections 82 are so determined as not to contact with the flange 5 in the assembly as shown in FIG. 1.

In such connecting mechanism at the inner peripheral part 9a of the diaphragm spring 9, with the release bearing 1, the diaphragm spring 9 can be moved relative to the lever plate 4 more easily, as compared with the conventional mechanism, because no part of the retainer plate 6 passes through the slits 10 of the diaphragm spring 9. Accordingly, even if deviation between the centers of lever plate 4 and flywheel 15 is produced at time of manufacture, the misalignment can be absorbed.

Further, the inner peripheral part 9a of diaphragm spring 9 is sandwiched between flange 5 of the lever plate 4 and the body 7 of the retainer plate 6 radially outside of the projections 82, so that its radial inward movement is restricted by the projections 82. Consequently, the claws 81 and the cylindrical body 40 can be prevented from being damaged by the inner peripheral part 9a.

According to the pull-type clutch of this invention as described above, the lever plate 4 has a radial outward flange 5 at an axial front side of its cylindrical body 40, the retainer plate 6 has plural claws 81 extending in radial inward directions and plural projections 82 extending in radial inward and further in axial forward directions, at its inner periphery of a disc-like annular body 7 with proper spaces left between them. A groove 41 is formed on an outer periphery of the cylindrical body 40 of the lever plate 4. The ends of the claws 81 fit in the groove 41 so as to secure the retainer plate 6 to the outer periphery of the cylindrical body 40. The inner peripheral part 9a of the diaphragm spring 9 is sandwiched between the flange 5 of the lever plate 4 and the disc-like annular body 7 of the retainer plate 6 at a place radially outside of projections 82 of the retainer plate 6. Therefore, the lever plate 4 can be moved easily relative to the diaphragm spring 9, so that the misalignment can be absorbed easily and the vibration of clutch pedal and the breakage of the sleeve 20 can be prevented. Moreover, the claws 81 and the cylindrical body 40 can be prevented from being damaged by the inner peripheral part 9a of the diaphragm spring 9.

INDUSTRIAL APPLICABILITY

The lever plate can be moved easily relative to the diaphragm spring, so that the misalignment can be absorbed easily and the vibration of clutch pedal and the breakage of the sleeve can be prevented. The pull-type clutch according to the present invention has a large industrial utility value.

What is claimed is:

1. A pull-type clutch having a release bearing fitted on a sleeve on an outer periphery of a clutch output shaft, a diaphragm spring having an inner peripheral part sandwiched between a lever plate and a retainer plate on an outer periphery of said release bearing sleeve, said release bearing being moved axially backward in a direction opposite to a flywheel to move said inner peripheral part of said diaphragm spring in said axial backward direction to disengage said clutch; characterized by that said lever plate has a cylindrical body with a radial outward flange on an axial front side of said cylindrical body, said retainer plate having a disc-like body with plural claws extending in radial inward directions and plural projections extending radially inward and in axial forward directions at an inner periphery of said disc-like body of said retainer plate with spaces between said claws and said projections, a groove formed on an outer periphery of said cylindrical body of said lever plate, said retainer plate claws having tip ends fitted in said groove for securing said retainer plate to said outer periphery of said cylindrical body, an inner peripheral part of said diaphragm spring being sandwiched between said flange of said lever plate and said disc-like annular body of said retainer plate radially outside of said projections of said retainer plate.

2. A pull-type clutch as set forth in claim 1, in which an outer periphery of said cylindrical body, axially rearward of said groove of said cylindrical body is formed into a tapered surface inclined radially inwardly and axially rearward.

* * * * *